United States Patent
Schlapp et al.

(10) Patent No.: US 7,057,383 B2
(45) Date of Patent: Jun. 6, 2006

(54) METHOD FOR DECOUPLING INTERFERENCE DUE TO BLEEDOVER IN METALLIC PIPE AND CABLE LOCATORS

(75) Inventors: Hubert Schlapp, Ebern (DE); Johan D. Overby, Sunnyvale, CA (US)

(73) Assignee: Metrotech Corporation, Inc., Santa Clara, CA (US)

( * ) Notice: Subject to any disclaimer, the term of this patent is extended or adjusted under 35 U.S.C. 154(b) by 191 days.

(21) Appl. No.: 10/842,239

(22) Filed: May 6, 2004

(65) Prior Publication Data

US 2005/0248333 A1    Nov. 10, 2005

(51) Int. Cl.
*G01R 19/00* (2006.01)
(52) U.S. Cl. .......................... 324/67; 324/326
(58) Field of Classification Search ................ 324/326, 324/67

See application file for complete search history.

(56) References Cited

U.S. PATENT DOCUMENTS

| | | |
|---|---|---|
| 5,194,812 A | 3/1993 | Yokoi |
| 5,260,659 A | 11/1993 | Flowerdew et al. |
| 5,798,644 A | 8/1998 | Eslambolchi et al. |
| 6,127,827 A | 10/2000 | Lewis |
| 6,215,888 B1 | 4/2001 | Eslambolchi et al. |
| 6,407,550 B1 * | 6/2002 | Parakulam et al. ......... 324/326 |
| 6,411,073 B1 | 6/2002 | Fischer et al. |
| 6,549,011 B1 * | 4/2003 | Flatt ........................... 324/326 |
| 6,756,783 B1 * | 6/2004 | Brune et al. ................ 324/326 |
| 2003/0058961 A1 | 3/2003 | Fling et al. |

FOREIGN PATENT DOCUMENTS

EP         1 217 391 A     6/2002

* cited by examiner

*Primary Examiner*—Michael Tokar
*Assistant Examiner*—Tyrone Jackson
(74) *Attorney, Agent, or Firm*—Finnegan, Henderson, Farabow, Garrett & Dunner, L.L.P.

(57) ABSTRACT

When cables run side by side over a longer distance, an alternating-current signal used for cable location can couple or 'bleedover' to neighboring cables. The coupled current flowing in the neighboring cable creates field distortion and makes position determination of the targeted cable difficult. The resulting magnetic field of both (or more) cables has a non-circular shape and is commonly known as a distorted field. Established methods for finding the position of the cable under investigation lead to inaccuracies or even wrong locates. The method described herein eliminates the field distortion that is due to the coupled cables by demodulating a phase reference signal placed on the cable by a transmitter into two signal strength constituents. The inphase signal represents the field strength of the targeted conductor and is substantially free of field distortion. The other quadrature signal contains the component of the field associated with distortion.

34 Claims, 9 Drawing Sheets

METHOD FOR DECOUPLING INTERFERENCE DUE TO BLEEDOVER IN METALLIC PIPE AND CABLE LOCATORS

BACKGROUND

1. Field of the Invention

The present invention relates to detection of electromagnetic signals from targeted hidden conductors and, in particular, to the decoupling of interference signals in detected signals from the targeted hidden conductors that result from bleedover of the transmitted signal to adjacent non-targeted conductors.

2. Discussion of Related Art

Underground pipe and cable locators (sometimes termed line locators) have existed for many years and are well known. Line locator systems typically include a mobile receiver and a transmitter. The transmitter is coupled to a target conductor, either by direct electrical connection or through induction, to provide a current signal on the target conductor. The receiver detects and processes signals resulting from the electromagnetic field generated at the target conductor as a result of the current signal, which can be a continuous wave sinusoidal signal provided to the target conductor by the transmitter.

The transmitter is often physically separated from the receiver, with a typical separation distance of several meters or in some cases up to many kilometers. The transmitter couples the current signal, whose frequency can be user chosen from a selectable set of frequencies, to the target conductor. The frequency of the current signal applied to the target conductor can be referred to as the active locate frequency. The target conductor then generates an electromagnetic field at the active locate frequency in response to the current signal.

Different location methodologies and underground environments can call for different active frequencies. The typical range of active locate frequencies can be from several Hertz (for location of the target conductor over separation distances between the transmitter and receiver of many kilometers) to 100 kHz or more. Significant radio frequency interference on the electromagentic field detected by the receiver can be present in the environment over this range. Therefore, receivers of line location systems have often included highly tuned filters to preclude interference from outside sources from affecting the measurement of signals at the desired active locate frequency from the target conductor. These filters can be tuned to receive signals resulting from electromagnetic fields at each of the selectable active locate frequencies and reject signals resulting from electromagnetic fields at frequencies other than the active locate frequencies.

In line location systems, the signal strength parameter determined from detection of the electromagnetic field provides basis for derived quantities of the current signal (i.e., the line current in the targeted conductor), position of the line locator receiver relative to the center of the conductor, depth of the conductor from the line locator receiver, and can also be used as the input to a peak or null indicator (depending on the orientation of the magnetic field to which that the detector is sensitive). All line location systems measure signal strength on one or more measurement channels.

Often in a crowded underground utility environment of metallic pipes and cables, coupling of signals at the active locating frequency from the target conductor to other adjacent underground conductors can occur. These conductors (lines) are not intended to be tracked by the line location system, but coupling of currents from the target conductor to those neighboring conductors through various means (resistive, inductive, or capacitive), termed "bleedover," can lead a line locator astray such that the operator of the line location system ceases tracking the targeted conductor (e.g., pipe or cable of interest) and instead begins following an adjacent line.

In conventional receivers, it is nearly impossible to determine whether the receiver is tracking the targeted conductor or whether the receiver is erroneously tracking a neighboring conductor. In complicated underground conductor topologies, the effect of interference from electromagnetic fields resulting from bleedover currents in neighboring conductors can result in significant assymetrical electromagnetic fields, which is termed field distortion. Further, conventional systems that attempt to distinguish between the targeted conductor and neighboring conductors typically rely on wireless or wired transmission of phase information from the transmitter, which may be located at such a distance from the receiver of the line locator that receiving such information is impractical.

Therefore, there is a need for line location systems capable of accurately determining the signal strength parameter from the targeted conductor exclusive of neighboring conductors that may provide signals that are a result of inductive or capacitive coupling, using a signal generation and processing method that utilizes only the targeted conductor (pipe or cable) as the transmission medium without relying on a separate communication channel for the transmitter and receiver to share phase information.

SUMMARY

In accordance with the present invention, a line locator and line locator system is presented that can distinguish between signals received from a targeted conductor and signals received as a result of bleedover to neighboring conductors. A receiver for a line locator according to some embodiments of the invention includes a first digital phase-locked loop coupled to receive an input signal and lock to a carrier frequency of the input signal; a second digital phase-locked loop coupled to receive an FM signal from the first digital phase-locked loop and lock to a modulation frequency of the input signal; and a quadrature demodulator coupled to receive the input signal and a frequency signal from the second digital phase-locked loop and provide an in-phase signal.

In some embodiments of the invention, a line locator system includes a transmitter coupled to provide a current signal to a target conductor, the current signal including at least one signal at a carrier frequency, the signal being modulated at a modulation frequency; and a locator. In some embodiments, the locator includes a detector system that provides at least one signal related to an electromagnetic field present at the locator; at least one receiver coupled to receive the at least one signal, each of the at least one receiver including a first digital phase-locked loop that locks to the carrier frequency of one of the at least one signal, a second digital phase-locked loop coupled to receive an FM signal from the first digital phase-locked loop and lock to the modulation frequency of the one of the at least one signal; and a quadrature demodulator coupled to receive the one of the at least one signal and a frequency signal from the second digital phase-locked loop and provide an in-phase signal; and a display coupled to receive the in-phase signal and provide information to a user.

A method of detecting signals associated with a target conductor while rejecting signals associated with bleedover to neighboring conductors according to some embodiments of the present invention includes providing an input signal in response to an electromagnetic field; locking to a carrier frequency of the input signal and providing an FM signal; locking to a modulation frequency in the FM signal signal and providing a frequency signal; and mixing the frequency signal with the input signal to provide an in-phase signal.

A method of determining a depth of a target conductor according to some embodiments of the present invention includes providing a current signal on the target conductor, the current signal including a signal at a carrier frequency, the signal being modulated at a modulation frequency; determining a target line signal strength at a plurality of positions, the plurality of positions disposed along a line substantially perpendicular to a line of travel of the target conductor; and determining the depth from the target line signal strength at the plurality of positions. In accordance with some embodiments of the invention, the target line signal strength at each of the plurality of positions can be determined by providing an input signal in response to an electromagnetic field at the position, locking to a carrier frequency of the input signal and providing an FM signal, locking to a modulation frequency in the FM signal signal and providing a frequency signal, mixing the frequency signal with the input signal to provide an in-phase signal, and determining the target line signal strength from the in-phase signal.

These and other embodiments are further discussed below with reference to the following figures.

In the figures, elements having the same designation have the same or similar functions. Elements in the figures are not drawn to scale.

DETAILED DESCRIPTION

Figure 1A:
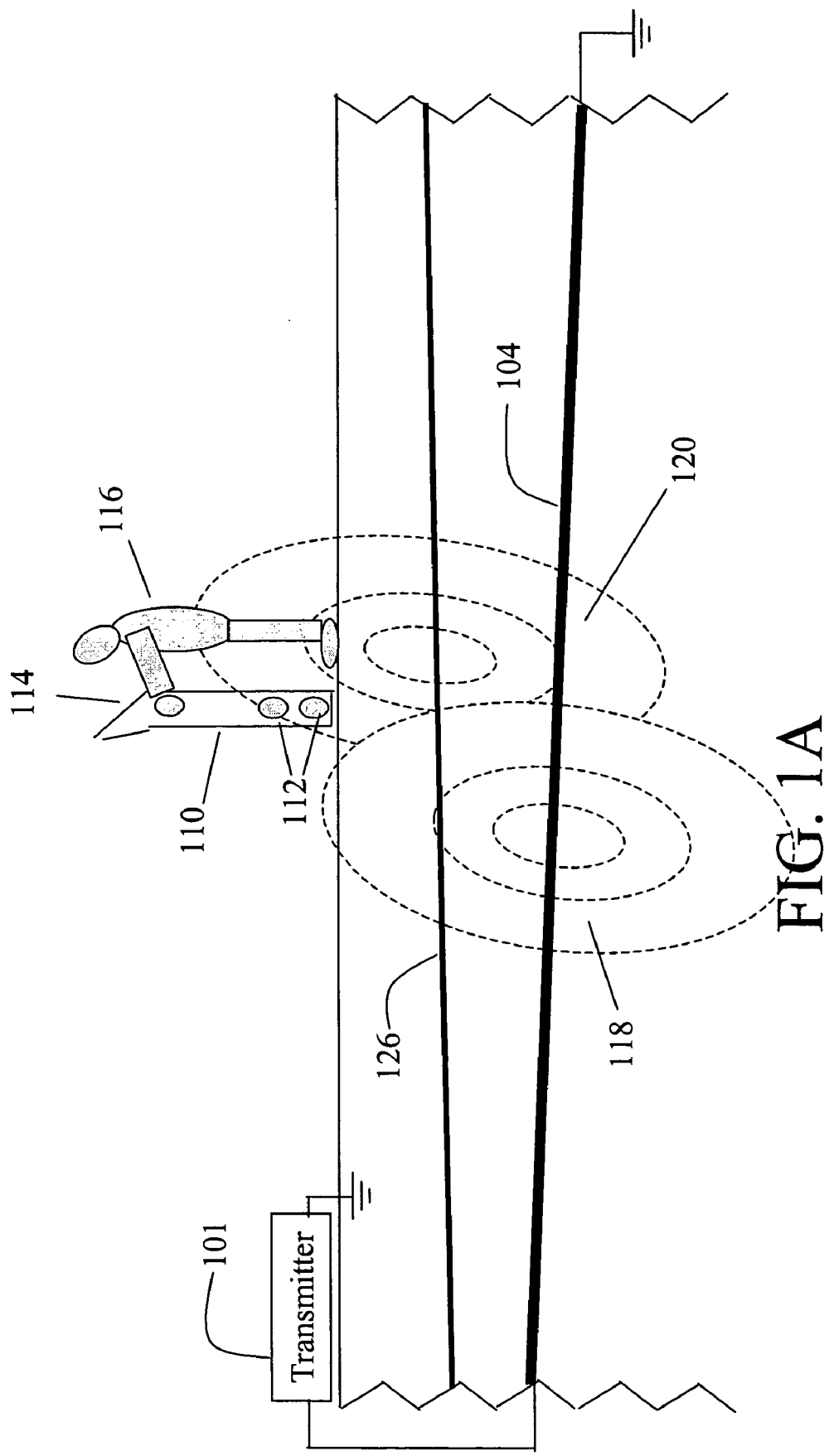
FIG. 1A illustrates utilization of a line locator system.

FIG. 1A illustrates a line location environment with a line locator. The line locator includes locator 110 and transmitter 101. Locator 110 can include an embodiment of receiver according to the present invention or may be a conventional locator. An example of a mostly digital implementation of a receiver 110 is described in U.S. application Ser. No. 10/622,376, "Method and Apparatus for Digital Detection of Electromagnetic Signal Strength and Signal Direction in Metallic Pipes and Cables," by James W. Waite and Johan D. Overby (the '376 application), which is assigned to the same assignee as is the present invention and herein incorporated by reference in its entirety.

Locator 110 is operated by operator 116 in order to locate target conductor 104. Target conductor 104 is directly coupled to transmitter 101. In many systems, transmitter 101 couples a current signal onto conductor 104. As discussed above, the current signal has a frequency at the active locate frequency, which can be one of a set of standardized frequencies. As shown in FIG. 1A, target conductor 104 can be below ground. Transmitter 101 can be coupled to line 104 directly at an above ground junction box or by digging to line 104 in a known location. Transmitter 101 can also be electrically coupled to line 104 inductively.

Receiver 110 includes detectors 112 and a display 114. Detectors 112 can be any detectors for determining an electromagnetic field. For example, detectors 112 can include coils which provide electrical signals in the presence of time varying magnetic fields. Electrical signals can be processed in receiver 110 and the results of the processing can be communicated to operator 116 on display 114.

Detectors 112, then, can detect magnetic field 118 generated by the current signal in target conductor 104. However, a current of the same frequency can be coupled into neighboring line 126 by resistive coupling, capacitive coupling, or inductive coupling. Neighboring line 126, then, can generate magnetic field 120. The signal provided to locator 110 by detectors 112, then, will reflect the contributions from both magnetic field 118 from target conductor 104 and magnetic field 120 from neighboring conductor 126. Calculations of the depth of target line 104 or the current in target line 104, then, may be inaccurate.

Removing interference from neighboring conductor 126 due to resistive coupling is discussed in U.S. Pat. No. 6,411,073, "Method and Device for Locating a Metal Line", by Volker Fraedrich and Gerhard Fischer (the '073 patent), which is herein incorporated by reference in its entirety. The '073 patent discloses a line location system with an FM modulation method generated by transmitter 101 (called "Signal Select") that allows transmitter 101 and receiver 110 to share a common phase reference. Subsequently, the '376 application describes a robust method of measurement at the receiver of the signal direction parameter, allowing the operator to detect situations when ground-return path signals are present on adjacent conductors. In those cases, receiver 110 presents a negative signal direction indication to the user, indicating that the measured field strength is due to a resistive bleedover from a conductor carrying a ground return current rather than being due to magnetic field 118 of target conductor 104.

It is often the case that resistive coupling occurs between adjacent lines. If resistive coupling occurs, the induced voltage signal in the adjacent line is reversed (180° out of phase) from the current signal present in the target conductor. This is because the current that has propagated to the adjacent line is seeking an easier (i.e., lower impedance) return path to the same ground stake at the transmitter of the line locating system. By convention, the outgoing signal from transmitter 101 is taken as the positive direction, and the incoming signal to transmitter 101 is taken as the negative direction. By monitoring the signal direction in addition to signal strength, one can detect a likely resistive coupling situation through a positive-to-negative direction change.

In the case where bleedover from line 104 to line 126 is inductive or capacitive, the problem is somewhat different. Inductive and capacitive bleedover can occur in long locates (i.e., where receiver 110 is well separated from transmitter 101) where target conductor 104 is of good quality and the resistance between ground and the cable sheath of target conductor 104 is high or, alternatively, where the active locate frequency is high (lowering the impedance threshold wherein capacitive coupling becomes a problem). In capacitive or inductive bleedover the signal on the neighboring conductor (e.g., conductor 126) undergoes a phase shift that corresponds to the transfer function of the coupling. In situations where the coupling is predominantly inductive or capacitive, the signal is 90° out-of-phase from the current signal that is transmitted by transmitter 101.

Sometimes the bleedover signal (the signal generated from detection of the electromagnetic field from the neighboring conductor) is significantly stronger than the signal generated in receiver 110 by detection of the electromagnetic field from target conductor 104 and completely dominates the measured field strength detected at receiver 110. A particularly problematic measurement situation occurs when the neighboring cable, for example conductor 126 in FIG. 1A, which carries a bleedover signal, is shallower than the target conductor. The combined signal at the receiver (e.g., the signal resulting from detection of both magnetic field 118 and magnetic field 120 at receiver 110) has the exact same frequency, the active locate frequency, as that of the current signal applied to target conductor 104 by transmitter 101 (it is assumed that the system is Linear Time Invariant (LTI), so the only phase changes observed are due to the bleedover coupling itself). In some cases, the electromagnetic field resulting from the bleedover signal in the shallower neighboring conductor can be stronger than the electromagnetic field generated by target conductor 104, in which case the measured signal at the receiver will tend toward a 90° phase shift from that imparted to targeted conductor 104 by transmitter 101.

In conventional receivers it is impossible to know or determine the phase of transmitter 101 at receiver 110 because transmitter 101 usually includes a free running oscillator driver. The field strength measured by locator 110, however, includes the effects of the inphase signals from detection of the electromagnetic field from targeted conductor 104 and the electromagnetic fields from the ground return, which are 180° out-of-phase, due to resistive bleedover, as well as the quadrature signals due to detection of electromagnetic fields from inductively or capacitively coupled lines. In complicated underground utility scenarios with significant coupling, the net magnitude of these signals can result in a non-concentric magnetic field, an effect which is commonly referred to as field distortion.

Some prior art line locate systems have circumvented significant field distortion caused by capacitive or inductive bleedover by dropping the active locate frequency to a low enough value that bleedover is avoided. However, for long locates over many kilometers, the active frequency generally needs to be lower than about 10 Hz to avoid significant bleedover. Examples of such systems are described in U.S. Pat. Nos. 5,798,644 and 6,127,827.

Other systems detect the presence of field distortion by comparing field strength signals derived from various detector coil configurations. Once detected, several techniques can be used to adjust the locate position of the target conductor for the distortion. A standard peak and null coil configuration is suggested in U.S. Pat. No. 6,215,888, from which the measured field strengths can be compared to models of field strengths stored in a database. More accurate target line positioning is then possible by deducing the most likely underground cable topology that would result in the measured field strengths utilizing the selected model of field strengths. Another method is described in U.S. patent application Ser. No. 10/189,342, by Russell Bigelow (the '342 application), which is assigned to Metrotech Corporation and herein incorporated by reference in its entirety. The '342 application refers to a numerical approach to compare signal strength measurements from three or more coils to those that would result from an undistorted field. Other approaches toward dealing with field distortion is to make use of position measurement methods to map the magnetic field over the surface of the ground and detect non-concentric fields, a good indication of distortion. A line locator that includes an inertial position-tracking device is described in U.S. patent application Ser. No. 10/407,705 "Buried Line Locator with Integral Position Sensing", by Gordon Pacey and assigned to Metrotech Corporation, which is herein incorporated by reference in its entirety.

In such previous systems, the measured field strength parameter, detected from the electromagnetic field at locator 110, can be a combination of both the radiating targeted conductor as well as other neighboring coupled conductors. When such coupling exists, the degree of distortion present is a primary factor in the overall quality of the target conductor locate. In resistively coupled situations, U.S. Pat. No. 6,411,073 and the '376 application teach that the signal direction parameter is useful to discriminate the targeted conductor from ground return currents present in parallel-coupled conductors. The direction of the signal at the receiver is derived from the Signal Select modulation to the signal imparted at the transmitter thus a common phase reference is available at the receiver.

The method described in U.S. Pat. No. 5,194,812 (the '812 patent) accomplishes noise reduction through the wireless (or above ground wired) transmission of the locate signal from the transmitter to the receiver. As long as the wireless link is robust and not itself subject to unknown phase lags, a phase reference is available to the receiver. Synchronous signal detection is achieved at the receiver using an analog mixer followed by a low-pass filter, resulting in a reduction of noise. The '812 patent did not discuss decoupling of distortion caused by inductive or capacitance coupling to other neighboring lines. Also, this method of signal phase reference transmission is prone to signal blockage and has a limited range, which limits its capabilities for long range line location. Time synchronization (and hence phase reference synchronization) between transmitter and receiver via a shared timebase like GPS is also limited by transmission path issues.

In accordance with the present invention, a locator 110 is presented that includes a receiver that separates the signal resulting from the detection of the electromagnetic field at receiver 110 into an inphase and a quadrature signal. Thusly, the signals resulting from the current signal applied to the targeted conductor and from resistively coupled bleedover are separated from signals resulting from inductive or capacitive bleedover. Embodiments of the present invention extend the receiver processing associated with Signal Select (as described in the '376 application) demodulation to allow a distinct separation of resistively coupled signals (from the target conductor and ground return path signals) from undesirable (distortion causing) signals caused by inductive or capacitive coupling.

The most frequent form of coupling is resistive, of which ground return currents in conductors lying parallel to the target line over the entire length of the locate are the most typical. This is a common problem in city scenarios. The current flowing through a cable returning via other cables (or ground) generates a magnetic field that is sensed with the opposite polarity by a coil antenna of receiver 110. On long cables, e.g., about 50 miles and longer, it is less likely that a non-targeted conductor lies parallel over the entire course and hence its facility as an easy (i.e., low impedance) ground return path is limited. More likely, close to the start and endpoint, there will be cables going the same direction for a while, but on the majority of the run, the other cables should just be local neighbors of limited co-located length. That implies that any coupling will be primarily inductive. Capacitive coupling, the third possibility, can play a role in dry and low ground-conductivity areas. If the coupling on the majority of the cable run is inductive, then there will be a phase difference of close to 90°, as it is loose coupling via mutual induction. For capacitive coupling, the phase in the coupled circuit will be −90°.

In many conventional cable locator receivers, the extracted signal phase has not been used as a measure of the coupling type because a solid phase reference with respect to the transmitter phase has not been achieved. The '376 application notes the development of a nested (dual) digital phase locked loop (DPLL) so that the Signal Select phase reference could be accurately recovered at the receiver. Some embodiments of the present invention described herein utilize a similar approach to recover a stable version of the FM modulation frequency applied by transmitter 101 and, in addition, allow the use of that recovered FM modulation frequency signal as a mixer input to a quadrature demodulator. The quadrature demodulated inphase signal includes all resistively coupled (0° and 180°) signals and the demodulated quadrature signal is representative of the net inductive and capacitive coupling (+/−90°). In addition, the sign of the inphase signal is taken as the signal direction, representing the net direction of the resistively coupled signal, as is described in the '376 application.

In some embodiments of the present invention, the processing at locator 110 of the Signal Select modulated locate signal can be further enhanced by averaging and/or low-pass filtering, allowing stable estimates of target line field strength (cleaned of substantially all contribution due to inductively or capacitively coupled lines), total field strength (including that due to all coupled lines), and signal direction. In some of these embodiments, it is not necessary to directly compare phases between two signals of different frequencies to estimate the signal direction. This is an important result in that the accuracy of phase comparison in a digital system is driven in part by the degree of oversampling in the signal processing. Parameter estimation via averaging is more robust than comparison of sample values, and the system can operate reliably for sample rates close to the Nyquist rate (no oversampling).

In some embodiments, the field strength values can be presented to user 116 at display 114 in a plot as a function of lateral position x over the targeted line, where x is the coordinate perpendicular to the cable. The areas with large differences between the total field strength and the target conductor field strength indicate the influence of a coupled line or lines. When the coordinate x is reliably obtained via tape measurement, laser range finding, inertial sensing, GPS navigation, or other survey methods, the target line field strength, being effectively cleaned of the influence of coupled lines, can be used to accurately triangulate or vector the coordinates of the underground conductor (both x position and depth).

Some embodiments of the invention facilitate the use of non-linear optimization methods to simultaneously estimate the depth, position, and current flowing in targeted conductor 104 from the target line field strength. These estimates are more reliable in the presence of magnetic field distortion due to inductive or capacitive coupling because the target line field strength more closely conforms to the physical model of a concentric field around the targeted conductor 104.

As a further confirmation of the presence of coupled lines and thus distortion, in some embodiments two or more active Signal Select modulated frequencies (one lower and one higher) can be placed on target conductor 104 by transmitter 101. For coupled lines the impedance drops with increasing frequency, thus the difference between the total field strength and target field strength will be larger at the higher frequency. Some embodiments of the invention described herein can utilize an efficient transmitter algorithm for generating multiple simultaneous Signal Select modulated frequencies on the targeted conductor. To support the comparison of the degree of field distortion at two or more frequencies, the receiver signal processing is expanded to implement multiple parallel Signal Select demodulation algorithms.

Figure 1B:
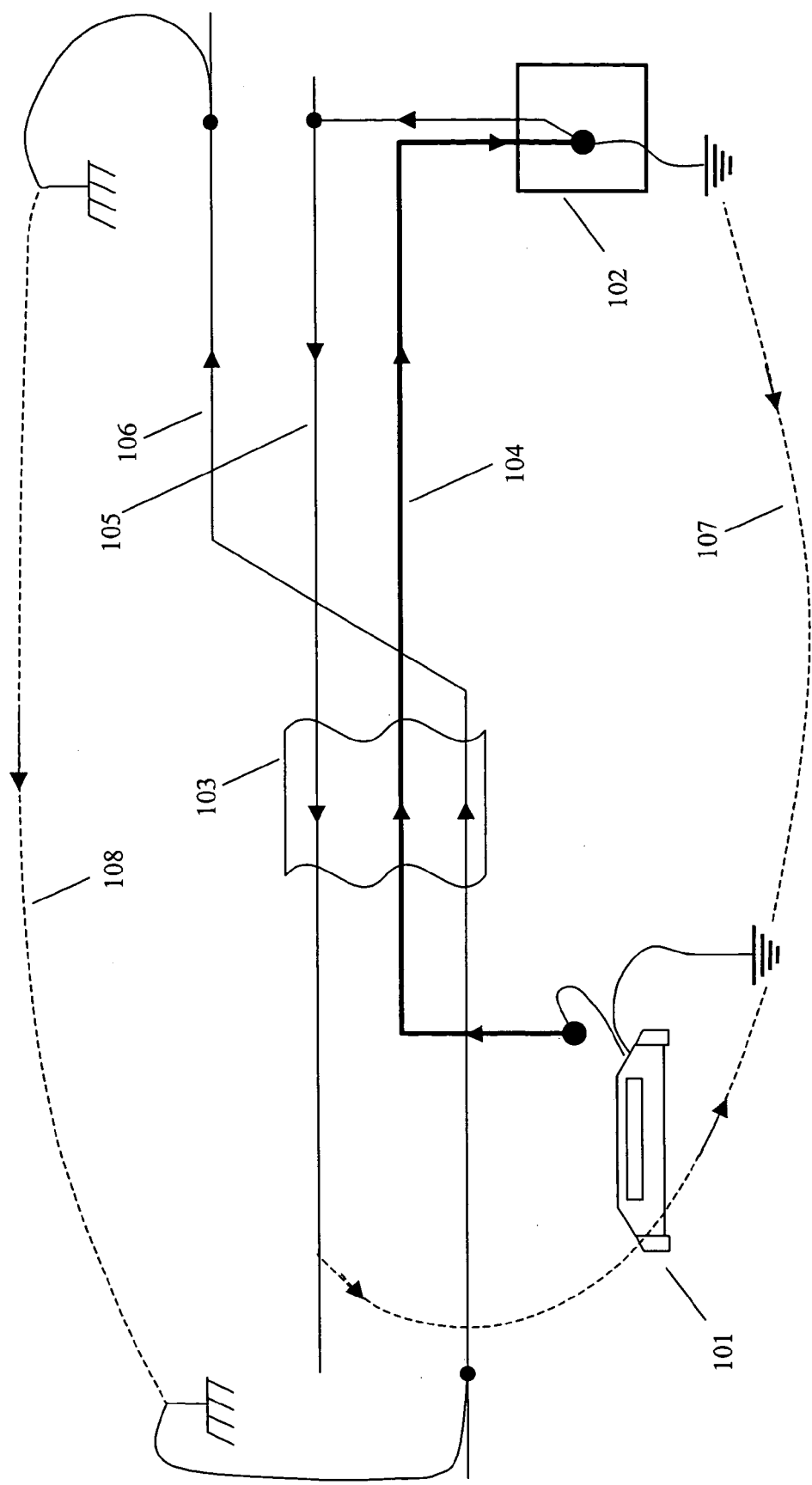
FIG. 1B illustrates an example of electrical circuits that can be created during line location in a particular conductor topology.

FIG. 1B is a depiction of a line locate scenario that involves a forward current from transmitter 101 to splice box, a reverse ground return current from the splice box back to the transmitter ground stake, and an induced current on neighboring line 106. The conductor topology illustrated in FIG. 1B shows a target conductor 104 and a neighboring conductor 106. FIG. 1B also illustrates a direct connection transmitter 101 electronically coupled to target conductor 104.

Line location using direct-connect transmitter 101 utilizes a galvanic connection to the targeted conductor 104 (also referred to as the targeted line) such as is illustrated in FIG. 1B. Often there is access to targeted conductor 104 through a splice or junction box 102 at the terminus of the line so that the far end of targeted conductor 104 (i.e., the end opposite transmitter 101) can be grounded to earth 107. In the case of telecommunication cables, for example, effective line tracing can be achieved by grounding the metal sheath around the copper or fiber optic cable at the far end, so that a closed loop AC circuit is created as shown by the combination of paths 104 and 107.

Transmitter 101 generates a current signal in target line 101. In accordance with embodiments of the present invention, the current signal includes one or more modulated signals on a carrier signal. In some embodiments, the current signal generated by transmitter 101 can include signals at more than one carrier frequency in order that the influences associated with coupled neighboring conductors, which can be frequency dependent, can be more clearly distinguished.

In a typical locate scenario, other lines adjacent to target line 104 may be present underground. Depending on the physical layout, these lines can also form part of an AC circuit that carries direct or coupled currents from transmitter 101. As shown in FIG. 1B, through a shared ground connection at splice box 102, line 105 can be electrically coupled to target conductor 104. As illustrated here, conductor 105 is resistively coupled to target conductor 104, i.e.

the current moving through target conductor 104 uses line 103 as a lower impedance ground return path to transmitter 101.

Another current that is also a result of the signal generated by transmitter 101 is flowing in conductor 106. This current is coupled into conductor 106 by virtue of inductive or capacitive coupling from target line 104 to conductor 106. In effect, a separate current loop is set up through a loosely coupled ground 108, so that the sense of the signal in coupled conductor 105 is still positive, i.e., in the same direction as the target conductor.

A line locator measuring the signal strength in region 103 thus sees a combination of signals due to the magnetic fields emanating from conductors 104, 105, and 106. The sum of these signals is a distorted field, since it no longer is concentric around the axis of targeted line 104, as it would be if only targeted line 104 were carrying a current signal at the locate frequency. Some locators have been able to discriminate the reverse direction signal 105 from the forward signal on the targeted line 104. Embodiments of the present invention can also explicitly identify the coupled signal present on conductor 106.

Figure 2:
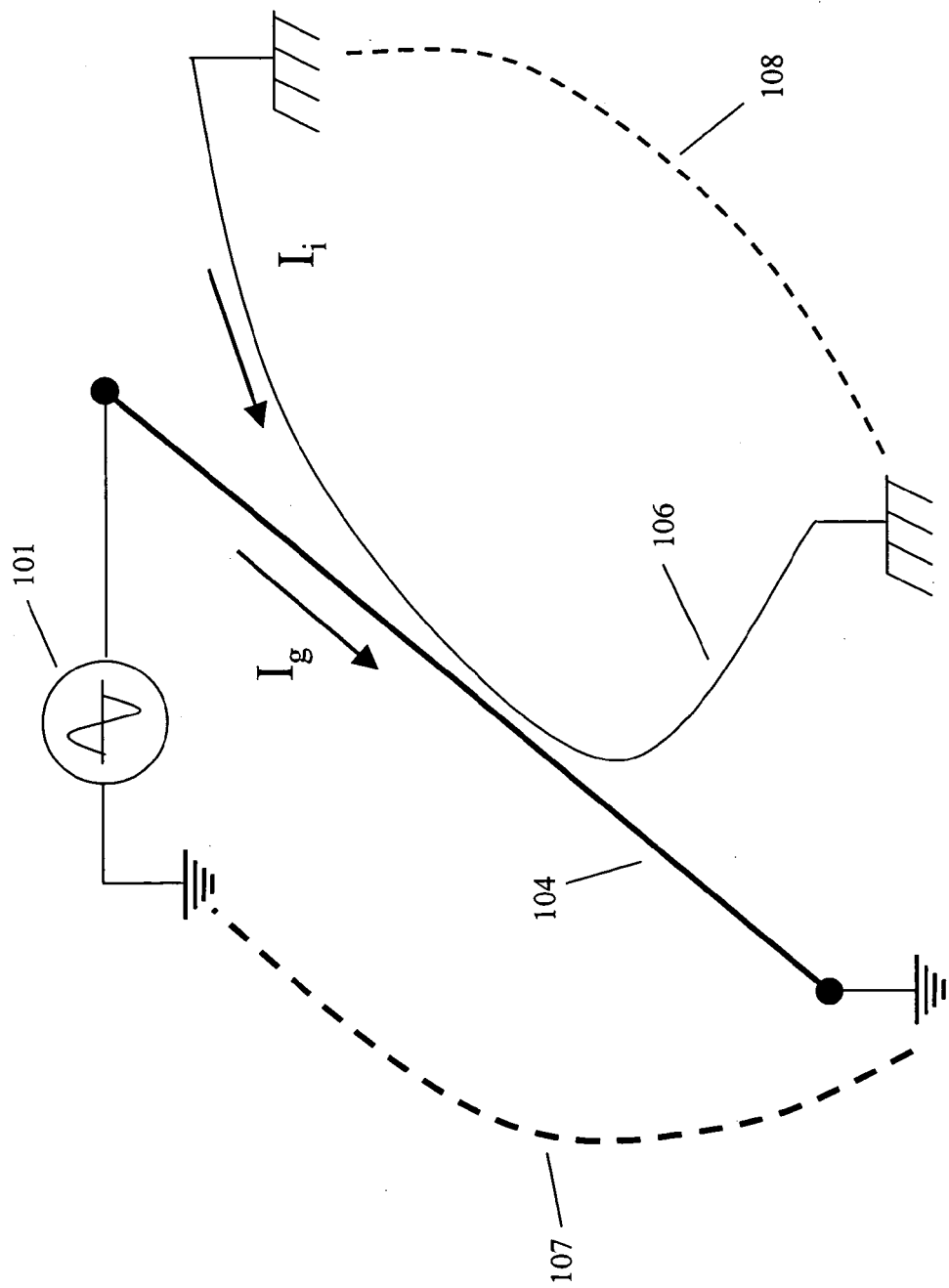
FIG. 2 shows a simplified equivalent circuit to those shown in FIG. 1B.

FIG. 2 shows a simplified equivalent circuit to that shown in FIG. 1B. In particular, FIG. 2 illustrates how mutual induction generates an AC current in coupled line 106. As shown in FIG. 2, the ground paths are loosely coupled as well. FIG. 2 is a simplified schematic of the situation, showing only the coupled conductor 106 carrying current $I_i$ and the target conductor 104 carrying current $I_g$ (for the galvanic, or directly coupled current). Transmitter 101 is represented in this schematic as a signal generator.

Figure 3B:
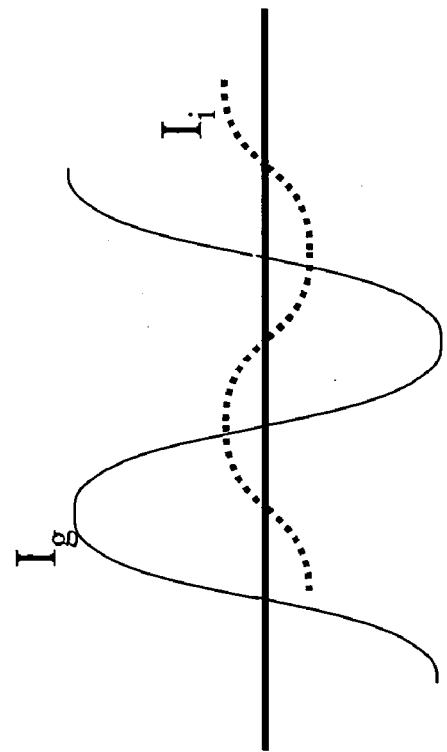
FIGS. 3A and 3B show schematically the equivalent electrical circuit of the situation shown in FIG. 2 and illustrates the current signals.
Figure 3A:
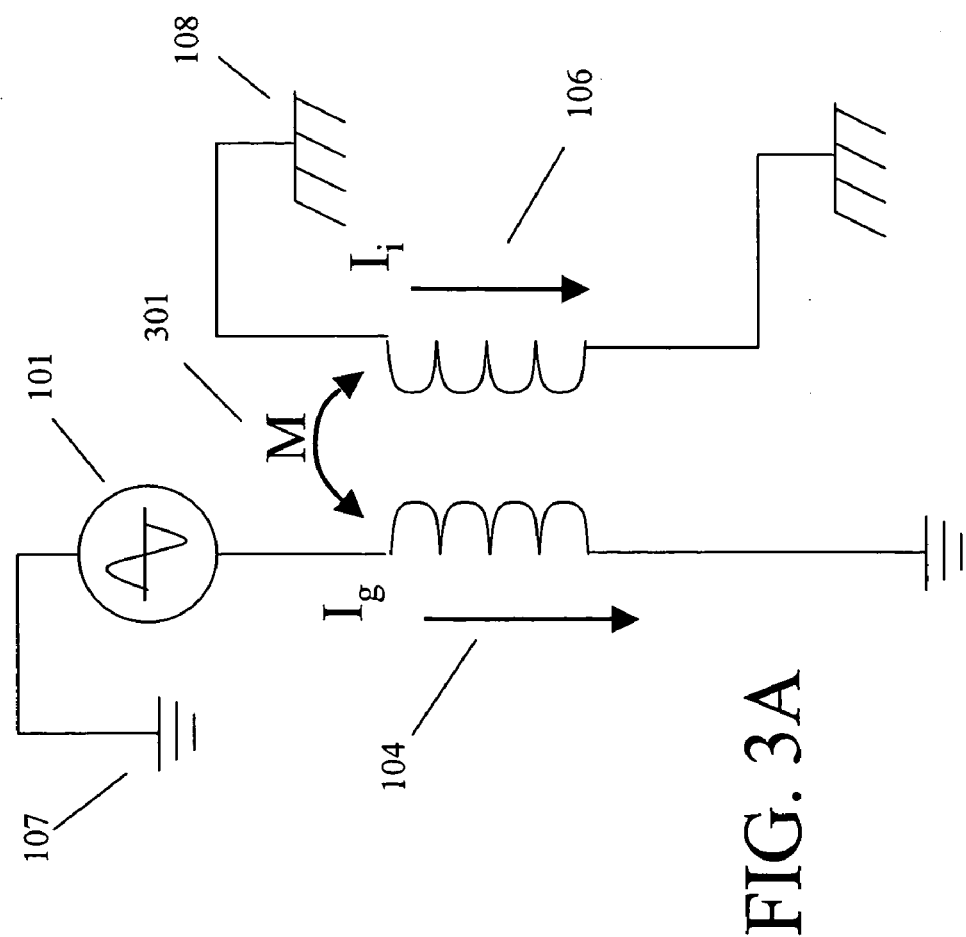

FIG. 3A is a further reduction of the problem to an equivalent electrical schematic, with the loops 104 and 105 coupled together through mutual inductance 301. It is well know that in the case of inductive coupling, the induced current $I_i$ lags the current in the primary loop $I_g$ by 90°, as is shown graphically in FIG. 3B.

Note that if the coupling between conductors 104 and 106 were capacitive instead of inductive, the situation is very similar. In this case, however, the current in the neighboring conductor 106 will lead the current in the primary loop target conductor 104 by 90°.

In accordance with embodiments of the present invention, the current signal applied to target conductor 104 (FIG. 1) by transmitter 101 includes a carrier frequency, which is the active line locate frequency discussed above. Further, a FM modulation frequency can be imposed on the current signal. In some embodiments, the FM modulation frequency is an integer multiple of the carrier frequency.

Figure 4:
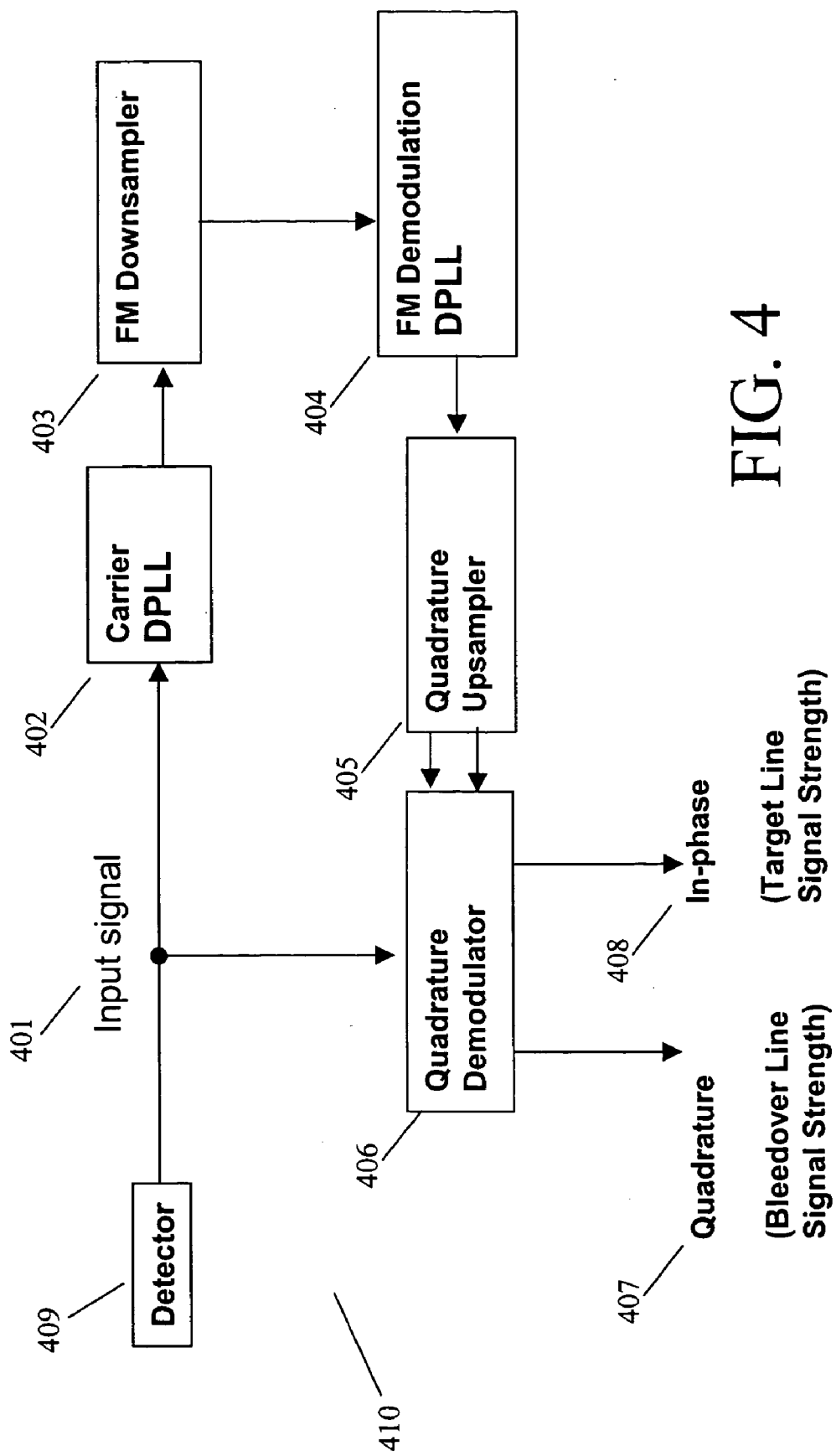
FIG. 4 illustrates in a block diagram of a receiver according to the present invention.

FIG. 4 illustrates a block diagram of a receiver 410 according to the present invention. As discussed above, receiver 410 is included in locator 110. Receiver 410 includes a detector 409 that detects the strength of an electromagnetic field and provides one or more input signals 401. In some embodiments, detector 409 can include magnetic field detectors as well as filters and digitizers. In some embodiments, locator 410 can include multiple individual receivers 410 with detectors 409 oriented to detect magnetic fields of the electromagnetic field that are directed in particular directions. Receiver 410 locks first onto the carrier frequency, i.e. the active locate frequency, in a digital phase-locked loop DPLL 402 and then onto the FM modulation frequency in DPLL 404 to provide a signal (the target line strength) that is not substantially influenced by inductive or capacitive bleedover to neighboring conductors.

In receiver 410, then, processing first demodulates the Signal Select FM signal from the carrier signal, and then subsequently demodulates the original input signal by the detected reference phase. Input signal 401, then, is first received in carrier DPLL 402. The output signal from DPLL 402 is coupled into FM Demodulation DPLL 404. Therefore, DPLLs 402 and 404 lock first to the carrier frequency, and next to the FM modulation frequency, which is an error term resulting from operation of the DPLL 402. In some embodiments, a downsampler 403 can be provided between DPLL 402 and DPLL 404 to improve processing efficiency because the FM modulation frequency can be a fraction of the carrier frequency. Some embodiments of carrier DPLL 402, downsampler 403, and FM demodulation DPLL 404 are further discussed in the '376 application.

An output signal from DPLL 404 is coupled into quadrature demodulator 406, where it is utilized to demodulate input signal 401. The resulting output signals from quadrature demodulator 406 include an in-phase signal 408 that is the target line signal strength and a quadrature signal 407 that is the inductive or capacitive bleedover line signal strength. In some embodiments, a quadrature upsampler 405 can be included so that the sampling rate of in-phase signal 408 and quadrature signal 407 is adjusted. Signals generated in receiver 410 can be further processed for display to user 116 and display 114.

Figure 5:
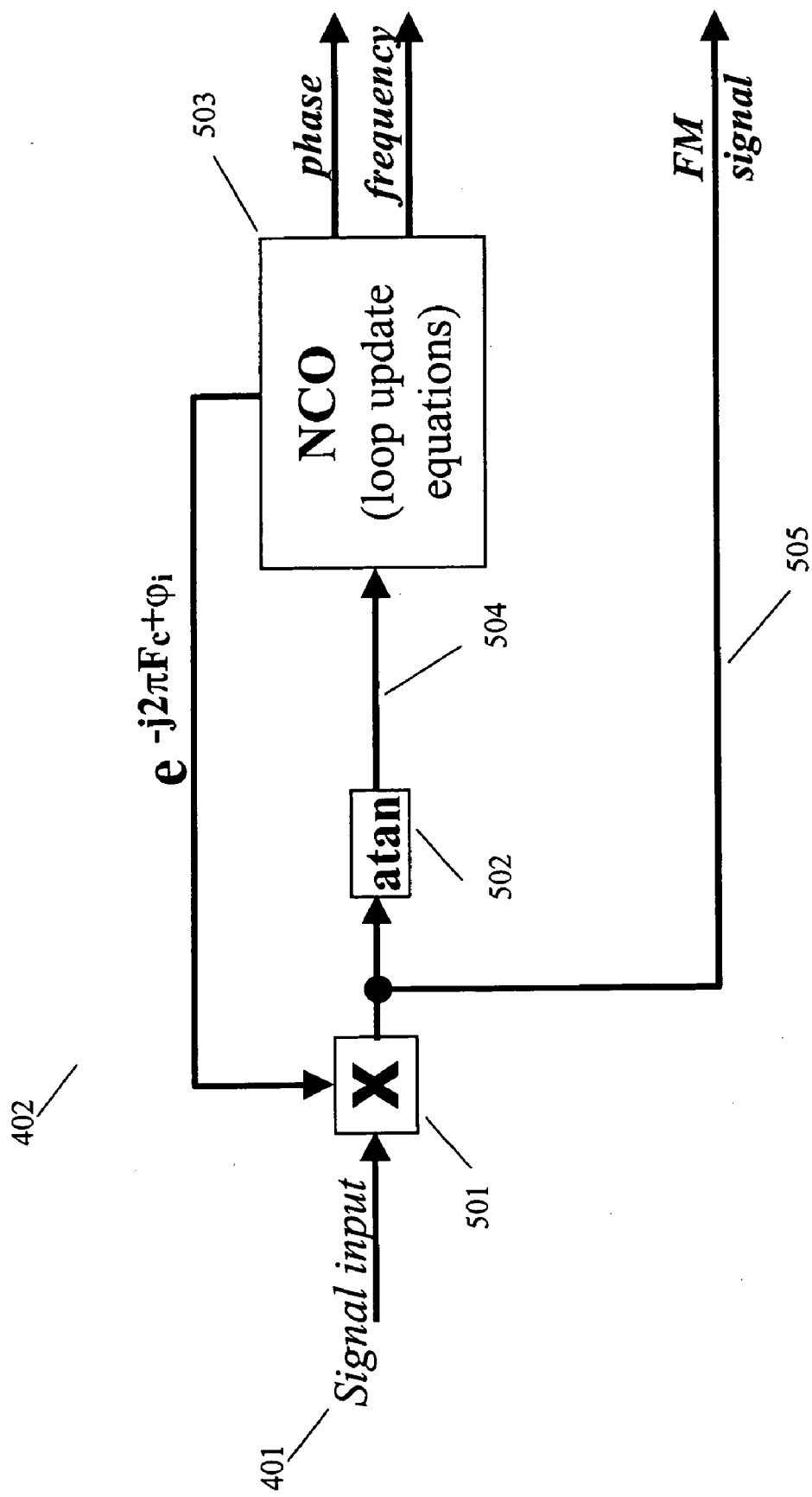
FIG. 5 illustrates a digital phase locked loop that can be utilized in embodiments of a receiver according to the present invention.

FIG. 5 illustrates an embodiment of carrier DPLL 402 according to the present invention. Carrier DPLL 402 includes a mixer 501 that mixes signal input 401 with a periodic function generated by numerically controlled oscillator (NCO) 503. A phase error signal 504 is created by inverse tangent function 502 that receives a complex output signal from mixer 501. A simple divide of the imaginary term by the real term of the input signal can also form a simple estimate of the phase error, since the inverse tangent function 502 is approximately linear about zero. The phase error signal 504 from inverse tangent function 502 is input to NCO 503 that adjusts the phase and frequency of the periodic function output to mixer 501 and can also output values for the phase and frequency. In some embodiments, NCO 503 can use second order loop equations to control the feedback to mixer 501, allowing DPLL 402 to gradually converge to a lock condition. At the lock condition, signal 505 represents the difference between the signal input 401 and the average carrier at frequency $F_c$, and is taken as a representation of the FM signal and is forwarded to FM DPLL 404.

Figure 6:
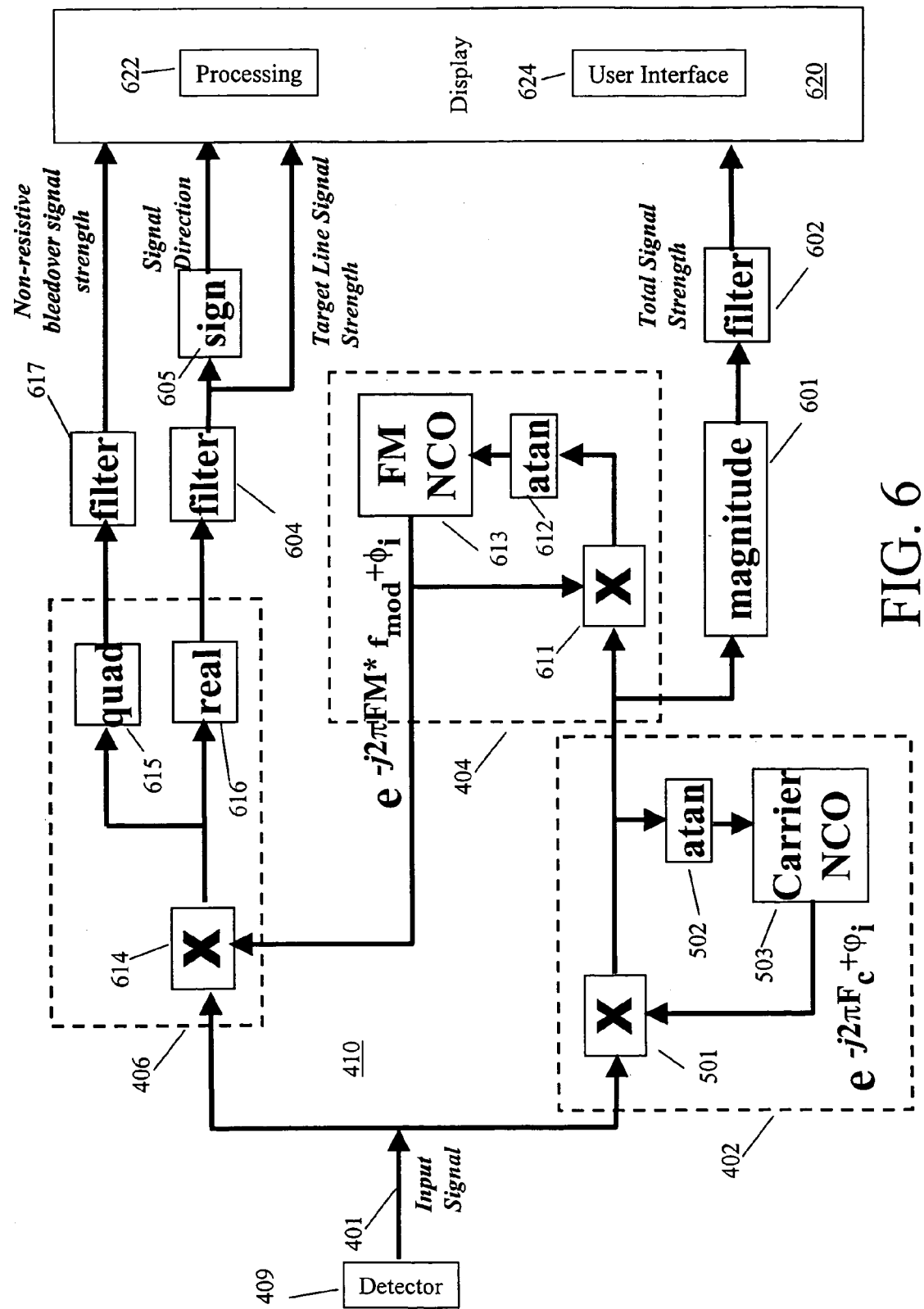
FIG. 6 illustrates another embodiment of receiver according to the present invention.

FIG. 6 illustrates another embodiment of receiver 410 according to the present invention. As shown, input signal 401 is input to quadrature demodulator 406 and carrier DPLL 402. As was discussed with regard to FIG. 5, carrier DPLL 402 includes mixer 501, arctangent function 502, and NCO 503. The FM signal from carrier DPLL 402 is input to FM DPLL 404. Again, as in DPLL 402 shown in FIG. 5, FM DPLL 404 includes a mixer 611, an arctangent function block 612, and a numeric controlled oscillator 613. As shown in FIG. 6, mixer 611 receives the FM signal from DPLL 402 and mixes an FM modulated signal output from numerically controlled oscillator 613. Numerically controlled oscillator (NCO) 613 adjusts the frequency and phase of the periodic function mixed in mixer 611 according to the FM phase error signal generated by arctangent function 612. In some embodiments, NCO 613 can use second order loop equations to control the feedback to mixer 611, allowing DPLL 404 to converge to a locked condition. The periodic feedback function input to mixer 611 in DPLL 404 is also input to quadrature demodulator 406.

In some embodiments, the magnitude 601 of the complex FM signal output from DPLL 402 can be input to filter 602 to provide a total signal strength signal 603. Total signal strength signal 603 includes contributions from target conductor 104, resistively coupled neighboring conductors such as conductor 105 shown in FIG. 1B, and inductively coupled neighboring conductors such as conductor 106 shown in FIG. 1B.

As shown in FIG. 6, quadrature demodulator includes a mixer 614, an in-phase filter 616, and a quadrature filter 615. Mixer 614 mixes input signal 401 with the sinusoidal function generated by DPLL 404. The output signal from mixer 614, then, is a DC signal with a real and imaginary portion. The real, or in-phase, portion is a result of signals originating from target conductor 104 or from conductors that are resistively coupled to target conductor 104. Therefore, in-phase filter 616 isolates the real portion of the signal output from mixer 614. The output signal from in-phase filter 616 can be input to filter 604. The output signal from filter 604 indicates the signal strength from target conductor 104 and from conductors that may be resistively coupled to target conductor 104. The sign of the output signal from filter 604, as is discussed in the '136 application, indicates the signal direction. The sign can be determined in sign block 605 in order to provide a signal direction signal.

The quadrature portion of the output signal from mixer 614 can be isolated in quad filter 615 and filtered in filter 617. The output signal from filter 617 provides the signal strength due to signals detected from neighboring conductors that are inductively or capacitavely coupled to target conductor 104.

Therefore, mixing the detected FM signal in quadrature with the incoming signal 401 allows for isolation of contributions from targeted conductor 104 and those conductors that may be resistively coupled to targeted conductor 104 from signals that are due to conductors that are capacitively or inductively coupled to targeted conductor 104. As is shown in FIG. 4, in some embodiments quadrature upsampler 405 can be included in order to return the sample rate back to that of input signal 401.

As is illustrated in FIG. 6, the phase reference established by transmitter 101 between the carrier signal and the FM signal is recovered by the combination of DPLLs 402 and 404, and this can be used to decouple the bleedover signal strength from the signal strength due to targeted line 104 and other resistively coupled elements. A quadrature demodulator is well suited for this task, representing a multiplication by a complex sinusoid, and results in the decomposition of the input signal into its real and imaginary parts. The imaginary part corresponds to the inductively or capacitively coupled signals that are 90° out of phase with respect to the real part. The real part represents the resistively coupled signals emanating from the target conductor and those conductors carrying return currents in the reverse direction.

The embodiment of receiver 610 shown in FIG. 6 represents an embodiment of a signal processing system that simultaneously calculates total signal strength 603, target line signal strength 606 (the real part of the quadrature demodulator 406), and the signal direction. Some embodiments may not include determination of non-resistive bleedover signal strength determination because the primary aim of receiver 610 may be to provide a signal strength estimate 606 that is cleaned of distortion, and thus can serve as the basis for unbiased depth and current measurements. The sign of the target line strength signal output from filter 604 is the signal direction of the resistively coupled component of input signal 401, which is used to determine whether the target signal is outgoing from the transmitter, or a ground return current such as that present on line 105. In this topology, the signal direction parameter is filtered and thus represents a true average; unlike more conventional methods that require phase comparisons between a reference carrier signal and a modulated signal. Filters 602, 604, and 605 can have low-pass characteristics and may be designed to dampen the signal strength values presented to the user via display device 114 (FIG. 1A).

The total signal strength measurement 603 is what is traditionally provided by line location systems. As has often been noted in the art, signal distortion present in signal 603 can lead to biased estimates of target line depth and position. In some embodiments, the relative amount of field distortion can be determined by a comparison of the target line signal strength signal output from filter 604 and the total signal strength signal output from filter 602. When total signal strength signal 603 is substantially the same as the target line signal strength output from filter 604, the measurement can be said to be free of distortion.

With the target line signal strength signal from filter 604 representing the field strength of target conductor 104 being cleaned of the effect of signal bleedover due to inductive or capacitive coupling, it is possible to use an optimization algorithm to compute the unbiased depth of target conductor 104 and current in target conductor 104 without substantial risk of converging on local minima, which might be the case if the distorted total signal strength signal 603 were used in the calculation. The above discussed signals generated in receiver 610 can be input to display 620. Display 620 can include a processor 622 and a user interface 624. Processor 622 can calculate various parameters and results based on, for example, the signal direction and target line signal strength signals. User interface 624 then can display results to user 116.

Figure 7:
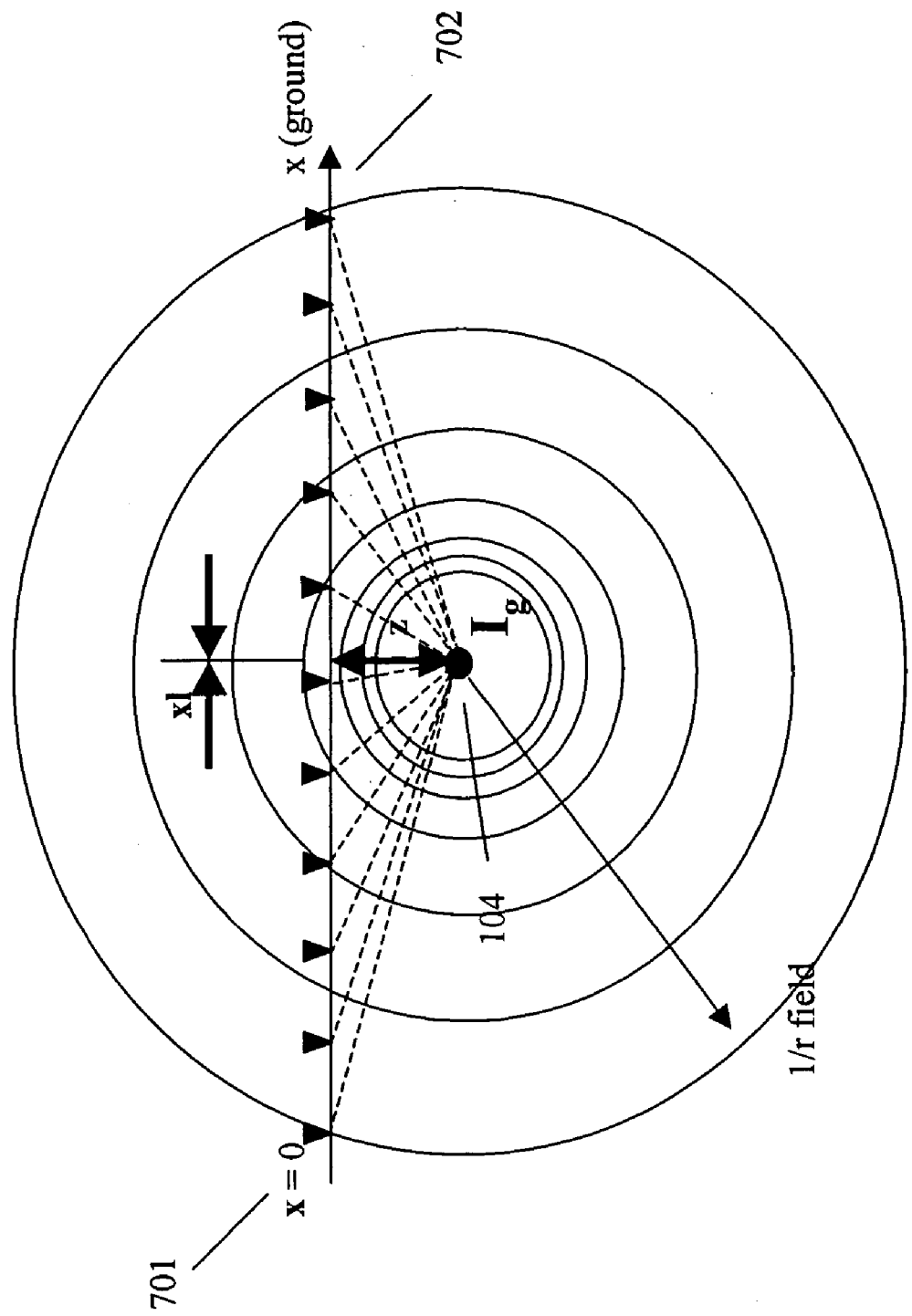
FIG. 7 is a cross section of an underground locate scenario with only one pipe or cable (directed into and out of the paper).

For example, FIG. 7 illustrates the geometry for determining the depth of target conductor 104. With the current $I_g$ on target conductor 104 flowing out of the paper, the user establishes an arbitrary reference position 701 and walks perpendicularly across the line in direction 702. There are three unknowns: the current $I_g$, the centerline position x1, and the depth z. Several to many independent measurements of the target line signal strength signal from filter 604 are collected automatically as the user walks across the line by, for example, processor 622 in display 620. In FIG. 7, the x-position of these measurements are noted by solid marks along the ground surface, and it is obvious to those trained in the art of signal processing that the x-increment between these measurements can be arbitrarily small and is limited only by the available instruction cycles.

Assuming a long linear target conductor 104, the signal strength amplitude for a distortion-free signal is given by the equation:

$$h_n := \frac{I}{\left[2 \cdot \pi \cdot \sqrt{(x_n - x1)^2 + z^2}\right]} \cdot \left(\cos\left(\operatorname{atan}\left(\frac{x_n - x1}{z}\right)\right)\right) \quad \text{(EQN. 1)}$$

where $I_g$ is the amplitude of the unknown current in the cable, which is constant for all measurements $h_n$. Note that for cylindrical fields, $h_n$ is inversely proportional to the radius from the measurement point to the cable (as is shown in the equation for $x_n = x1$). Only the series of amplitude measurements along the ground in the x-direction (at known x-intervals) is known. For simplicity, we can assume that coordinate x is perpendicular to the cable axis, although in some embodiments the analysis can be expanded such that field strength measurements may be taken at a set of arbitrary x, y, and z positions (where y is the direction of the cable). In some embodiments, the x, y, and z positions can be determined by a position determination system included in locator 110.

Figures 8A, 8B:
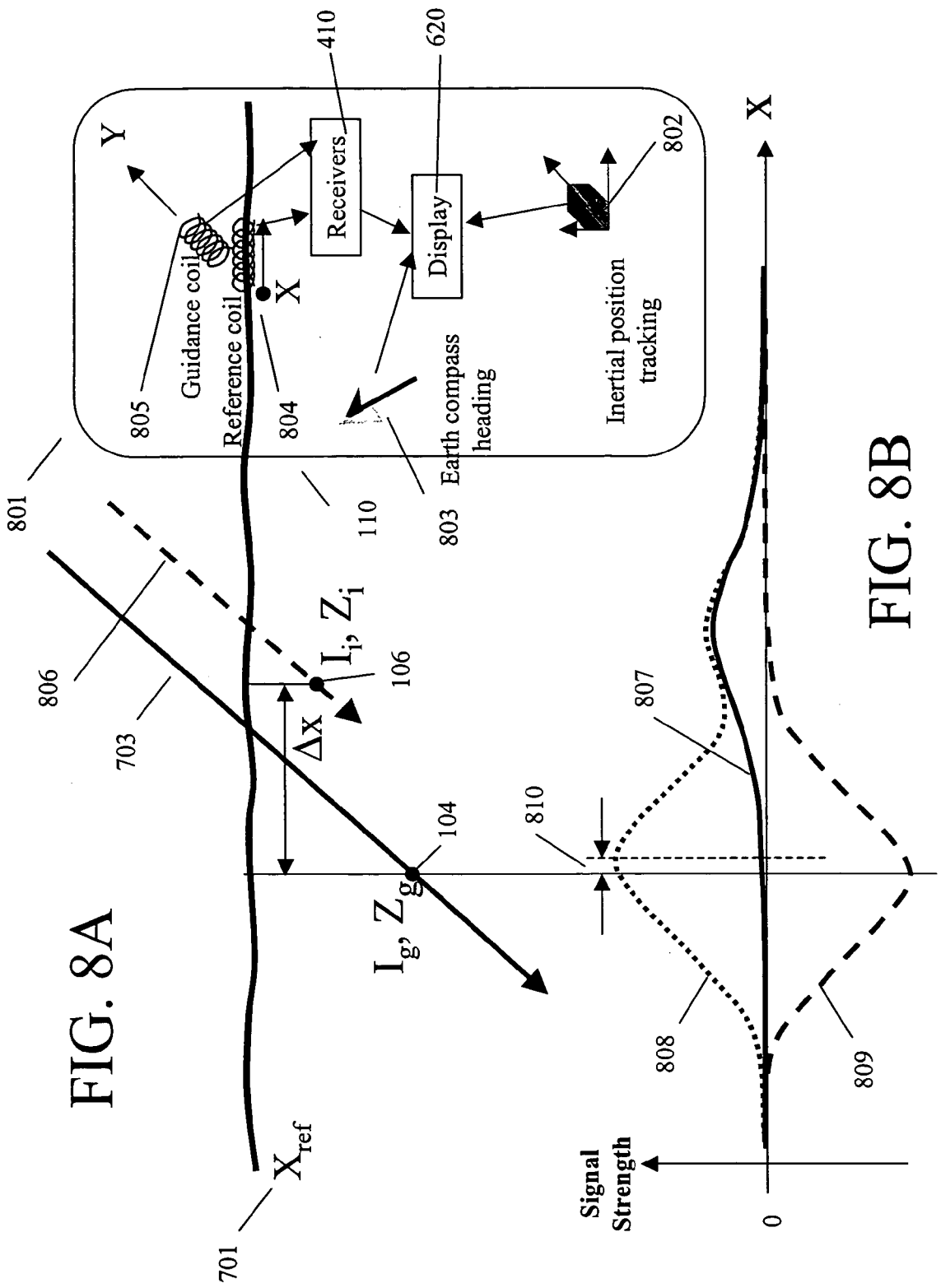
FIGS. 8A and 8B illustrate determination of line location and depth with two buried conductors separated by an unknown distance.

FIG. 8A illustrates two buried cables 104 and 106 separated by an unknown distance. The solid line represents the galvanic current in the resistively coupled target conductor. The dashed line represents the induced current in a parallel line, which may be at a different depth underground. FIG. 8A also shows the key measurement sensors in an embodiment handheld locator 110 that allow an automatic creation of the x-vector corrected field strength plots shown in FIG. 8B.

FIG. 8B shows the field strength magnitude (dotted line), as well as the inphase (dashed line) and quadrature (solid line) component outputs that result from the bleedover decoupling method. The field strength magnitude is composed of signals from both the target conductor as well as a parallel conductor that is carrying a current due to mutual inductance. Estimation errors will result if this signal strength magnitude is used to vector the depth and position of the target line.

As shown in FIG. 8A, handheld line locator 110 with receiver 410 according to the present invention are coupled to display 620, which can include processor 622 and user interface 624, to display the total field strength from which the user can deduce the presence of a target conductor 104, in rough coordinates. However, the total field strength signal is distorted by the presence of conductor 106, which carries current $I_i$ in the same direction as conductor 104 due to inductive bleedover. Lines 104 and 106 are separated by an unknown distance $\Delta x$. The bleedover decoupling method as implemented in the signal processing receiver 410 shown in FIG. 6 allows a separation of the signals emanating from conductors 104 and 106 (and measured by reference coil 804), thus allowing an improvement in the estimate of location of target conductor 104.

In addition to the reference coil 804 from which is derived the input signal 401 in detector 409, locator receiver 110 can include a 3-axis inertial position tracking system 802, an electronic Earth compass 803, and a guidance coil 805. With these devices, each of which can provide measurements at small intervals x, it is possible to convert a walking traverse of the line in a generally transverse direction to an exactly perpendicular traverse along a line calibrated in distance units. Earth compass 803 provides a general heading that should be followed by the user, and is used to correct the walked line back to a straight path. The inertial position (as derived by integrations of the 3-axis acceleration in trading 802) allows the ability of the system processor to calculate absolute distance along the path (in 3-d space). In the concentric field of a long linear conductor, the guidance coil will have a null response when the walking line is exactly perpendicular. Thus the measured field strength of the guidance coil can be used to correct the walking path to a perpendicular across the target pipe or cable.

Clearly other such means of correcting the measurement position to a perpendicular path across the target cable are possible, using laser rangefinders, radar or ultrasonic position measurement devices, and simple measuring tools like wheels and tape measures.

In this way, the position of reference coil 804 during the "walkover locate" can be corrected to allow a presentation of the field strength as shown in FIG. 8B. The position along the abscissa x represents the perpendicular distance across the line, with an arbitrary starting position $X_{ref}$. Trace 808 is the overall magnitude of signal strength as derived from a recorded set of signals 603. Trace 809 represents the substantially distortion free signal from the inphase output of the quadrature demodulator, as derived from a recorded set of signals 606. It is negative, since by convention the positive direction y refers to the target line direction, and in the example presented in FIG. 8A, the current is flowing in the negative y direction. At each measurement point on the x-axis, the sign of the filtered inphase output 605 of quadrature demodulator 406 is taken as the signal direction. For comparison, trace 807 is the filtered quadrature output as a function of transverse position over the line. Trace 807, then, represents the signal emanating from the coupled conductor 106, which is 90° out of phase with respect to that from target line 104.

The simultaneous solution for z, x1, and $I_g$ is a nonlinear minimum mean square problem. One embodiment of the solution is to use an optimization algorithm, for example a Levenberg-Marquardt algorithm, and to fit the data in three dimensions simultaneously (unknown x1, z, and I). Initial conditions of all three quantities are deduced based on rough field information. The Levenberg-Marquardt algorithm uses multiple iterations to minimize the sum of squares of the quantities $|h_n - h_n'|$, where $h_n'$ are the measured values of the signal strength along the x axis.

If the set of signal strength results 808 (representing the total field strength from both conductors) are taken as the measurement values $h_n'$ in EQN. 1, there will be a biased outcome, as indicated by the centerline error 810. An even worse behavior is that the optimization will converge to the wrong set of values due to the distortion in the 1/r field as a result of the presence of the coupled conductor. But when the target line field strength result set 809 forms the input to the optimization routine, a well-behaved simultaneous solution for x1, z, and $I_g$ can be obtained and can have good convergence properties. In this case no bias is introduced in the centerline or depth position.

The embodiments described herein are examples only of the invention. Other embodiments of the invention that are within the scope and spirit of this disclosure will be apparent to those skilled in the art from consideration of the specification and practice of the invention disclosed herein. It is intended that the specification and examples be considered as exemplary only and not limiting. The scope of the invention, therefore, is limited only by the following claims.

What is claimed is:

1. A receiver for a line locator, comprising:
a first digital phase-locked loop coupled to receive an input signal and lock to a carrier frequency of the input signal;
a second digital phase-locked loop coupled to receive an FM signal from the first digital phase-locked loop and lock to a modulation frequency of the input signal; and
a quadrature demodulator coupled to receive the input signal and a frequency signal from the second digitor phase-locked loop and provide an in-phase signal.

2. The receiver of claim 1, wherein the first digital phase-locked loop comprises:
a mixer that mixes the input signal with a periodic feedback function having a frequency and a phase related to the carrier frequency and providing a mixed signal;
an arctangent function coupled to receive the mixed signal and provide a phase error signal; and
a numerically controlled oscillator coupled to provide the periodic feedback function in response to the phase error signal.

3. The receiver of claim 2, wherein a total signal strength signal is provided in response to the magnitude of the mixed signal.

4. The receiver of claim 2, wherein the second digital phase-locked loop comprises:
a second mixer that mixes the FM signal with a second periodic feedback function with a frequency and a phase related to the modulation frequency and provide a second mixed signal;
a second arctangent function coupled to receive the second mixed signal and provide a second phase error signal; and
a numerically controlled oscillator coupled to receive the second phase error signal and provide the frequency signal in response to the second phase error signal.

5. The receiver of claim 4, wherein the quadrature demodulator includes a third mixer coupled to mix the input signal with the frequency signal and a real filter coupled to receive a signal from the third mixer and to provide a target line signal strength signal.

6. The receiver of claim 5, wherein a signal direction signal is determined from the sign of the target line signal strength signal.

7. The receiver of claim 5, further including a quadrature filter coupled to receive the signal from the third mixer and to provide a non-resistive bleedover signal strength signal.

8. The receiver of claim 1, further including a downsampler coupled between the first digital phase locked loop and the second digital phase locked loop.

9. The receiver of claim 1, further including a quadrature upsampler coupled between the second digital phase locked loop and the quadrature demodulator.

10. The receiver from claim 1, wherein a signal strength from a target conductor is derived from the in-phase signal.

11. A locator, comprising
a detector system that provides at least one signal related to an electromagnetic field present at the locator;
at least one receiver coupled to receive the at least one signal, each of the at least one receiver including
a first digital phase-locked loop that locks to a carrier frequency of one of the at least one signal,
a second digital phase-locked loop coupled to receive an FM signal from the first digital phase-locked loop and lock to a modulation frequency of the one of the at least one signal; and
a quadrature demodulator coupled to receive the one of the at least one signal and a frequency signal from the second digital phase-locked loop and provide an in-phase signal; and
a display coupled to receive the in-phase signal and provide user information to a user.

12. The locator of claim 11, wherein the detector system includes one or more detectors sensitive to the magnetic field of the electromagnetic field and one or more digitizers to digitize the at least one signal from signals provided by the one or more detectors.

13. The locator of claim 11, wherein the first digital phase-locked loop comprises:
a mixer that mixes the at least one signal with a periodic feedback function having a frequency and a phase related to the carrier frequency and providing a mixed signal;
an arctangent function coupled to receive the mixed signal and provide a phase error signal; and
a numerically controlled oscillator coupled to provide the periodic feedback function in response to the phase error signal.

14. The locator of claim 13, wherein a total signal strength signal is provided in response to the magnitude of the complex FM signal.

15. The locator of claim 13, wherein the second digital phase-locked loop comprises:
a second mixer that mixes the FM signal with a second periodic feedback function with a frequency and a phase related to the modulation frequency and provide a second mixed signal;
a second arctangent function coupled to receive the second mixed signal and provide a frequency signal; and
a numerically controlled oscillator coupled to receive a second phase error signal and provide the frequency signal in response to the second phase error signal.

16. The locator of claim 15, wherein the quadrature demodulator includes a third mixer coupled to mix the at least one signal with the frequency signal and a real filter coupled to receive a signal from the third mixer and to provide a target line signal strength signal.

17. The locator of claim 16, wherein a signal direction signal is determined from the sign of the target line signal strength signal.

18. The locator of claim 16, further including a quadrature filter coupled to receive the signal from the third mixer and to provide a non-resistive bleedoever signal strength signal.

19. The locator of claim 11, further including a downsampler coupled between the first digital phase locked loop and the second digital phase locked loop.

20. The locator of claim 11, further including a quadrature upsampler coupled between the second digital phase locked loop and the quadrature demodulator.

21. The locator of claim 11, further including a compass coupled to the display to provide direction information.

22. The locator of claim 11, further including an inertial position tracking coupled to the display to provide location information.

23. The locator of claim 11, wherein a field strength from a target conductor is derived from the in-phase signal.

24. A method of eliminating field distortion, comprising demodulating a phase reference signal placed on a target conductor by a transmitter into an in-phase and a quadrature signal.

25. The method of claim 24, wherein the in-phase signal represents the substantially distortion free field strength from the target conductor.

26. A line locator system, comprising:
a transmitter coupled to provide a current signal to a target conductor, the current signal including at least one signal at a carrier frequency, the signal being modulated at a modulation frequency; and
a locator, the locator, comprising
a detector system that provides at least one signal related to an electromagnetic field present at the locator;
at least one receiver coupled to receive the at least one signal, each of the at least one receiver including
a first digital phase-locked loop that locks to the carrier frequency of one of the at least one signal,
a second digital phase-locked loop coupled to receive an FM signal from the first digital phase-locked loop and lock to the modulation frequency of the one of the at least one signal; and
a quadrature demodulator coupled to receive the one of the at least one signal and a frequency signal from the second digital phase-locked loop and provide an in-phase signal; and a display coupled to receive the in-phase signal and provide user information to a user.

27. A line locator system, comprising:
means for coupling a current signal to a target conductor;
means for receiving a signal related to an electromagnetic field present at a locator;
means for locking onto a carrier frequency of the current signal;
means for locking onto an FM signal from the means for locking onto the carrier frequency; and
means for performing a quadrature demodulation from a frequency signal from the means for locking onto the modulation signal.

28. A method of detecting signals associated with a target conductor while rejecting signals associated with bleedover to neighboring conductors, comprising:
providing an input signal in response to an electromagnetic field;
locking to a carrier frequency of the input signal and providing a phase error signal;
locking to an FM signal and providing a frequency signal; and
mixing the frequency signal with the input signal to provide an in-phase signal.

29. The method of claim 28, further including providing a total signal strength signal from the magnitude of the complex FM signal.

30. The method of claim 28, further including providing a target line signal strength signal from the in-phase signal.

31. The method of claim 30, further including providing a signal direction signal from the target line signal strength signal.

32. The method of claim 28, further including providing a quadrature signal.

33. The method of claim 32, further including providing a non-resistive bleedover signal strength signal from the quadrature signal.

34. A method of determining a depth of a target conductor, comprising:
providing a current signal on the target conductor, the current signal including a signal at a carrier frequency, the signal being modulated at a modulation frequency;
determining a target line signal strength at a plurality of positions, the plurality of positions disposed along a line substantially perpendicular to a line of travel of the target conductor; and
determining the depth from the target line signal strength at the plurality of positions,
wherein the target line signal strength at each of the plurality of positions is determined by
providing an input signal in response to an electromagnetic field at the position,
locking to a carrier frequency of the input signal and providing an FM signal,
locking to the modulation frequency in the FM signal and providing a frequency signal,
mixing the frequency signal with the input signal to provide an in-phase signal, and
determining the target line signal strength from the in-phase signal.

* * * * *